(12) United States Patent
Hipp

(10) Patent No.: US 6,812,450 B2
(45) Date of Patent: Nov. 2, 2004

(54) METHOD AND AN APPARATUS FOR MONITORING A PROTECTED ZONE

(75) Inventor: Johann Hipp, Hamburg (DE)

(73) Assignee: Sick AG (DE)

( * ) Notice: Subject to any disclaimer, the term of this patent is extended or adjusted under 35 U.S.C. 154(b) by 17 days.

(21) Appl. No.: 10/093,087

(22) Filed: Mar. 5, 2002

(65) Prior Publication Data

US 2003/0168581 A1 Sep. 11, 2003

(30) Foreign Application Priority Data

Mar. 5, 2002 (DE) .......................................... 101 10 416

(51) Int. Cl.[7] .............................................. H01J 40/14
(52) U.S. Cl. .................... 250/221; 340/549; 340/545.3; 356/4.06; 356/3.11
(58) Field of Search ................................ 250/206, 234, 250/221, 222.1, 701.6; 356/4.01, 612, 394, 4.06, 4.07, 4.08, 5.01, 141.1, 3.11; 340/557, 541, 549, 545.3, 555, 556, 552, 686.6

(56) References Cited

U.S. PATENT DOCUMENTS

| | | | | |
|---|---|---|---|---|
| 3,727,207 A | * | 4/1973 | Missio et al. ................ | 340/557 |
| 4,225,226 A | | 9/1980 | Davidson et al. | |
| 4,903,009 A | * | 2/1990 | D'Ambrosia et al. ....... | 340/556 |
| 4,967,183 A | | 10/1990 | D'Ambrosia et al. | |
| 5,414,255 A | * | 5/1995 | Hampson .................... | 250/221 |
| 5,508,511 A | * | 4/1996 | Zur et al. ................. | 250/222.1 |
| 5,612,781 A | * | 3/1997 | Ohtomo et al. .......... | 356/152.2 |
| 5,903,355 A | * | 5/1999 | Schwarz ...................... | 356/394 |
| 6,466,157 B1 | * | 10/2002 | Bjornholt et al. ............. | 342/28 |

FOREIGN PATENT DOCUMENTS

| | | |
|---|---|---|
| DE | 3514982 C2 | 10/1985 |
| DE | 295000873 U1 | 4/1995 |
| DE | 4411448 A1 | 10/1995 |
| DE | 19828000 C2 | 1/2000 |
| EP | 0 396 822 A1 | 11/1990 |
| EP | 0486430 A2 | 5/1992 |
| WO | WO 99/28696 A1 | 6/1999 |

* cited by examiner

*Primary Examiner*—David Porta
*Assistant Examiner*—Stephen Yam
(74) *Attorney, Agent, or Firm*—Townsend and Townsend and Crew, LLP

(57) ABSTRACT

A method for monitoring a protected zone in which a light ray is transmited by an apparatus in the direction of the protected zone, a light ray reflected/remitted by an object disposed in the protected zone is received and the distance between the apparatus and the object is determined. The arrangement is such that at least two light rays are transmitted which include an angle between them; that, with an object present inside the protected zone, a first light ray reflected/remitted by the object is received; that, with an object-free protected zone, a second light ray reflected/remitted from a location disposed outside the protected zone is received; and that the distance from the apparatus of both the object and the second location is determined. Furthermore the present invention relates to a corresponding apparatus.

30 Claims, 4 Drawing Sheets

METHOD AND AN APPARATUS FOR MONITORING A PROTECTED ZONE

BACKGROUND OF THE INVENTION

The invention relates to a method for monitoring a protected zone in which a light ray is transmitted by an apparatus in the direction of the protected zone, a light ray reflected/remitted by an object disposed in the protected zone is received and the distance between the apparatus and the object is determined. The invention further relates to an apparatus for monitoring a protected zone comprising a transmitter unit for transmitting a light ray in the direction of the protected zone, a receiver unit for receiving a light ray reflected/remitted by an object disposed in the protected zone and an evaluation unit for determining the distance between the apparatus and the object.

Such methods and apparatuses are known from the prior art and serve, for example, to detect objects which move into a protected zone, whereupon a specific action, for example a warning signal or a switching off of a machine, is triggered. It is important, in particular if the methods and apparatuses are used for securing hazardous machinery, that objects penetrating into the protected zone are reliably recognized, which means that, on the one hand, the operability of the apparatus must be checked constantly and, on the other hand, it must be ensured that the apparatus cannot be manipulated.

SUMMARY OF THE INVENTION

In one embodiment, a method in accordance with the invention includes at least two transmitted light rays which include an angle between them; wherein, with an object present within the protected zone, a first light ray reflected/remitted by the object is received; wherein, with the protected zone free of an object, a second light ray reflected/remitted from a position disposed outside the protected zone is received; and wherein the distance from the apparatus of both the object and the second position is determined.

In another embodiment, an apparatus includes a transmitter unit designed to transmit at least two light rays which include an angle between them; a receiver unit designed for the reception of a first light ray reflected/remitted by an object disposed within the protected zone and of a second light ray reflected/remitted from a position disposed outside the protected zone; and an evaluation unit designed to determine the distance from the apparatus of both the object and the position located outside the protected zone.

In accordance with an embodiment of the invention, work is therefore carried out not only with one, but at least with two light rays which have different orientations. The second light ray is oriented in this connection such that it is reflected/remitted from a position which lies outside the protected zone if the light path of this light ray is not interrupted by an object present inside the protected zone. The first light ray is oriented such that it is reflected/remitted by an object if this object is present in the protected zone. If the protected zone is object-free, the first light ray does not necessarily have to be oriented such that it is reflected/remitted from a position disposed outside the protected zone; it can rather also be directed into "infinity". It is only decisive for the first light ray that it is oriented such that if an object to be detected is present in the protected zone, it will also actually impinge on this object.

In accordance with an embodiment of the invention, the first light ray therefore serves to detect an object present in the protected zone, whereas the second light ray serves to constantly detect the background lying outside the protected zone and/or to determine the distance of this background from the apparatus. It thereby becomes possible to constantly and actively check the operability of the apparatus, since when no background is recognized or if the background is displaced, then either an object is present in the protected zone or a malfunction or a manipulation/maladjustment of the apparatus is present.

Moreover, it becomes possible in certain cases to determine the distance from the apparatus of an object disposed inside the protected zone by both light rays in a redundant manner—and thus with increased reliability, with a valid measurement only being present when at least substantially the same distance result is obtained via both light rays.

Embodiments of the invention thus make possible the operation of an apparatus of the kind initially named with the highest possible reliability since the operability of the apparatus can be constantly checked, manipulations of the apparatus are immediately recognized and maladjustments of the apparatuses can be determined and in certain applications the reliability of the distance determination between the object to be detected and the apparatus can also be increased by redundant measurement.

The emitted light rays for the periodic scanning of the protected zone are preferably deflected inside a plane which extends at least substantially perpendicular to the plane containing the transmitted light rays. It is achieved by this measure that not only a protected zone can be monitored which extends frontally, substantially on a straight line in front of the apparatus, but rather that the monitoring of an angular range surrounding the apparatus is possible. Such an angular range can amount to, for example, 180° or 360°.

It is preferred if the respective deflection angles of the emitted light rays are detected, since then the positions from which the light rays are reflected/remitted can be determined from the distance values and the associated deflection angles. It can then therefore not only be determined whether an object is disposed inside the protected zone, but it furthermore becomes possible to determine the position of the object within the protected zone.

The distance values determined can be compared with previously stored distance values or positions determined from distance, and deflection angle values can be compared with previously stored positions. A warning signal or error signal can be produced in this case, for example, when at least a pre-set difference occurs between the determined distance values and the previously stored distance values or between the determined positions and the previously stored positions. It is moreover possible to define specific stored distance values or positions as permitted distance values or positions, with then no warning signal or error signal being emitted when the currently determined distance values or positions correspond to these stored distance values or positions.

It is of advantage if the positions of the protected zone boundaries are stored, since it can be determined in this case whether an object is located inside or outside the protected zone. With an object disposed outside the protected zone, for example, the emission of a warning signal or of an error signal can then be suppressed.

It is preferred if the second emitted light ray is directed at least in a first range of deflection angles onto the floor or the ceiling of a region surrounding the protected zone. Since the location of the floor or the ceiling does not change as a rule during the operation of the apparatus, it is achieved in this manner that the second transmitted light ray is in each case reflected/remitted from unchanged positions when the protected zone is object-free so that the information is unchanging which is supplied via the second light ray and relates to the background lying outside the protected zone. This variant of the invention is thus advantageous with respect to an alternative variant in which the second light ray is directed, for example, to walls and doors, since in this case, for example, the opening of a door brings about a change in the background information and can thus result in a triggering of a warning signal or of an error signal.

It is, however, also generally possible that the second transmitted light ray is directed in a second range of deflection angles to objects disposed outside the protected zone such as walls or stationary machinery. These articles are, however, preferably immovable relative to the apparatus for the reason.

It is advantageous if a reference contour is determined in that the second light ray scans the floor or the ceiling of a region surrounding the protected zone and/or articles disposed outside the protected zone and in each case that position is determined at which the second light ray is reflected/remitted. This reference contour then represents a background reference signal; it can be determined by a comparison of a currently determined background contour with the stored background reference contour whether any changes have been made in the background which are intended, for example, to bring about a manipulation of the apparatus. A warning signal can then be emitted in this case.

The first transmitted light ray can extend parallel or inclined relative to the floor of the protected zone so that objects disposed inside the protected zone can be detected by the first light ray. In this connection, it is important that the first light ray is oriented such that generally all objects disposed at any positions within the protected zone can be detected by the first light ray and can thus be recognized.

A "protected zone not free" signal can already be generated when the first transmitted light ray detects an unpermitted object inside the protected zone.

A "protected zone free" signal is preferably generated when the floor or the ceiling of a region surrounding the protected zone is detected by means of the second light ray and, at the same time, the first transmitted light ray is not reflected/remitted by an unpermitted object disposed inside the protected zone. In this connection, the detection of the region surrounding the protected zone by means of the second light ray ensures that the apparatus is operable and that no maladjustment/manipulations occur, whereas the first light ray ensures that no unpermitted object is disposed inside the protected zone.

A "protected zone free" signal can, however, alternatively also only be generated when the contour determined by means of the second light ray does not differ, or differs only within pre-set threshold values, from a stored reference contour and, at the same time, the first transmitted light ray is not reflected/remitted by an unpermitted object disposed inside the protected zone. In this variant, it is therefore not only required that the background or the region surrounding the protected zone is "recognized" or detected by means of the second light ray, but the currently determined background contour must additionally agree with a stored background contour at least within pre-set limits. In this way, for example, maladjustments or manipulations can be reliably recognized.

It is of advantage if the respectively current contour of the background is determined by means of the second light ray in specific time intervals and is compared with the stored background reference contour, with a maladjustment signal or a manipulation signal being produced when the current contour differs from the background reference contour at least by a pre-set degree.

At least one further transmitted light ray can be directed at least in a first range of deflection angles onto the floor or the ceiling of a region surrounding the protected zone in order to additionally increase reliability. In particular, this further transmitted light ray can be directed in a second range of deflection angles to articles disposed outside the protected zone such as walls or stationary machinery. In this way, the second light ray in accordance with the invention can more or less be "duplicated", with the light rays scanning regions surrounding the protected zone being able to have a different orientation so that they supply background information differing from each other in each case.

It is equally possible to "duplicate" the first light ray in accordance with the invention in that at least one further transmitted light ray extends parallel or inclined relative to the floor of the protected zone so that, in turn, all objects disposed inside the protected zone can be detected by this further light ray. In this case, it is then possible, for example, that the distance between the apparatus and an object disposed inside the protected zone is determined in a redundant manner via at least two transmitted light rays and a "protected zone free" signal is only generated when the determined distance values do not differ from one another, or only differ within a pre-set tolerance. This redundant distance determination brings about a further increase in reliability.

The light rays can be produced in the form of light pulses, with the distance values then being calculated via the respective light transit time. Alternatively, the distance values can, however, also be determined via a triangulation measurement.

It is particularly advantageous if at least one, and preferably all, transmitted light rays are guided via a reflecting/remitting reference target which is preferably arranged inside the apparatus. It can be continuously checked with this measure whether all light transmitters responsible for the transmission of the light rays are operating properly.

Furthermore, the distance from the reference target can be determined in a redundant manner via two transmitted light rays. It can thereby be checked whether the distance determination is operating properly, since if two different distances from the reference target are determined, a warning signal can be emitted. A "protected zone free" signal can only be generated in this case if the determined distance values do not differ from one another, or only differ within a pre-set tolerance.

The same advantages can be achieved by means of the apparatus in accordance with the invention which have already been explained above in connection with the method in accordance with the invention. Moreover, the apparatus in accordance with the invention can be provided with additional means which are suitable for the carrying out of all those method variants which were described as preferred or advantageous above.

The apparatus in accordance with an embodiment of the invention is preferably fitted with a light deflection unit, in particular with a prism head, to deflect the transmitted light rays inside a plane, with the plane extending at least substantially perpendicular to the plane containing the transmitted light rays. The advantage already described above of the monitoring of an angle region surrounding the apparatus can be achieved with such a light deflection unit.

Furthermore, an angle detection unit can be provided for determining the respective deflection angle of the transmitted light rays. The position of objects inside and outside the protected zone can be determined by means of this angle detection unit in combination with the evaluation unit for determining the distance.

The first and second light rays can be produced by means of a beam fan which interacts with a single light transmitter of the transmitter unit. It is, however, also equally possible to equip the transmitter unit with at least two light transmitters which produce at least the first and the second light rays either simultaneously or in time multiplex.

The receiver unit can be equipped with only one single light receiver which is designed for the reception occurring in time multiplex of at least the first and second light rays. It is, however, equally also possible to make the receiver unit as a double or multiple receiver, with then a separate receiver being available for each light ray.

It is particularly advantageous if an additional receiver is provided for the reception of a light signal transmitted by the transmitter unit and guided inside the apparatus to the additional receiver. It is possible to permanently monitor the operation of the transmitter unit by means of this additional receiver.

It is furthermore advantageous if a reflecting or remitting reference target, preferably arranged inside the apparatus, is provided which is detected by one, more or all transmitted light rays. Those advantages can be achieved with this reference target which have already been described in connection with the corresponding preferred method in accordance with the invention.

The invention will be described in the following with reference to embodiments and to the drawings.

BRIEF DESCRIPTION OF THE DRAWINGS

FIG. 1b depicts a plan view of the arrangement in accordance with FIG. 1a;

FIG. 2b depicts a plan view of an arrangement in accordance with FIG. 2a;

FIG. 3b depicts a plan view of the arrangement in accordance with FIG. 3a;

FIG. 4b depicts a plan view of the arrangement in accordance with FIG. 4a;

DESCRIPTION OF THE PREFERRED EMBODIMENTS

Figure 1A:
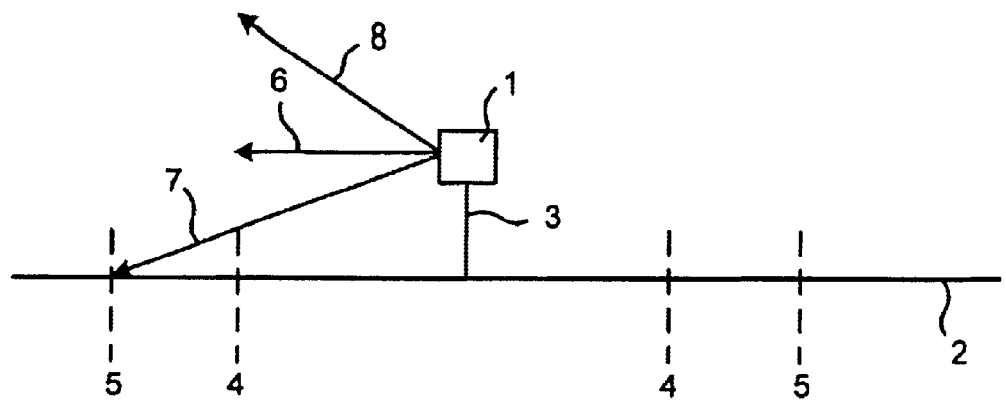
FIG. 1a depicts a schematic side view of an arrangement for carrying out the method in accordance with an embodiment of the invention.
Figure 1B:
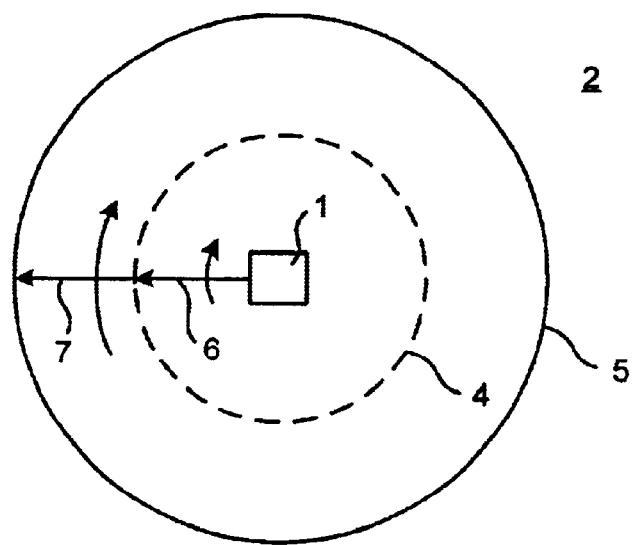

FIGS. 1a and 1b show an apparatus 1 in accordance with an embodiment of the invention, which is installed at a floor region 2 by means of a stand 3.

The apparatus 1 is surrounded by a protected zone whose outer boundary is characterized by the broken line 4. The protected zone thus surrounds the apparatus in an angle range of 360°.

A first light ray 6 is transmitted parallel to the floor 2 by the apparatus 1. Furthermore, a further light ray 7 is transmitted by the apparatus 1 which is directed obliquely downward to the floor 2 such that it impinges on the floor 2 outside the boundary of the protected zone 4.

Both light rays 6, 7 are deflected over an angle range of 360° in the direction of the arrow (FIG. 1b) by means of a deflection unit present in the apparatus 1. This deflection has the effect that the first light ray 6 would detect all objects which were disposed at the height of the apparatus 1 inside the boundary of the protected zone 4. The deflection furthermore has the effect that the second light ray 7 impinges on the floor 2 along a line 5, with this line 5 extending completely outside the boundary of the protected zone 4.

Consequently, with an object-free protected zone, the first light ray 6 is always directed at infinity and supplies—since no objects are present in the protected zone—only distance values which represent distances between the apparatus 1 and objects arranged outside the protected zone 4. No warning signals occur as a result of these distance values since these distance values clearly show that no object is present inside the protected zone.

The second light ray 7 is constantly reflected back/remitted by the floor 2 along the line 5 to the apparatus 1 so that distance values are permanently reflected back/remitted here which represent the distance between the apparatus 1 and the line 5. The presence of these distance values confirms a proper operation of the unit. If these distance values are compared with previously stored desired distance values (reference background contour), it can furthermore be determined if the apparatus 1 or the environment are being maladjusted or manipulated. In this case, an error signal can then be emitted. However, as long as the distance values determined by means of the second light ray 7 agree with the stored distance value at least within pre-set limits, an error-free operation of the unit 1 is signalled.

A "protected zone free" signal is therefore always emitted when the first light ray 6 only supplies distance values which allow articles to be concluded which are disposed outside the protected zone 4 and when the second light signal 7 permanently supplies distance values which correspond to a stored background reference contour. The first light ray 6 or second light ray 7 may also be guided by a reflecting/remitting reference target 100 arranged in apparatus 1. Furthermore, a further transmitted light ray 11 may be directed at least in a first range of deflection angles to the floor or the ceiling of a region surrounding the protected zone if desired. This further transmitted light ray may be directed in a second range of deflection angles to articles such as walls or stationery machinery disposed outside the protected zone.

Figure 2A:
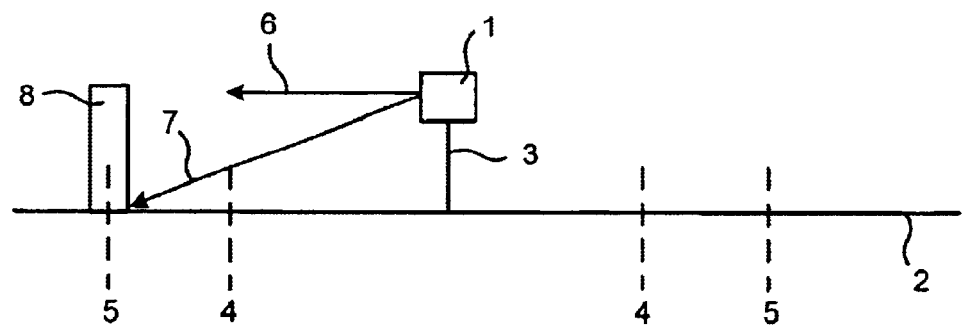
FIG. 2a depicts a side view in accordance with FIG. 1a with an article disposed in the background.
Figure 2B:
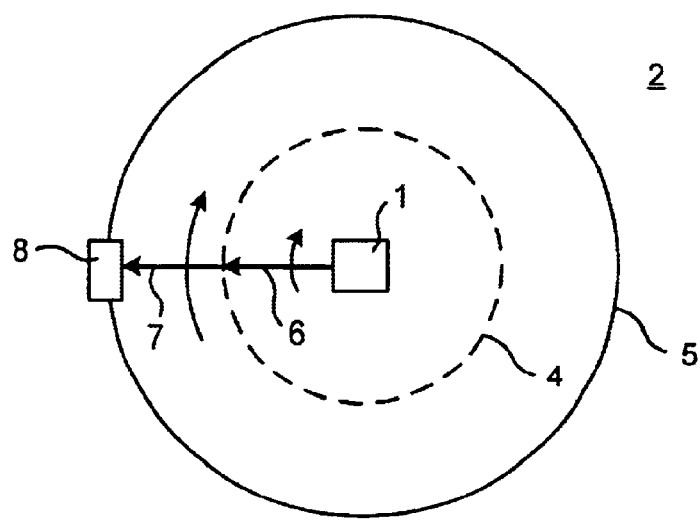

The arrangement in accordance with FIGS. 2a, 2b substantially corresponds to the arrangement in accordance with FIGS. 1a, 1b, with the difference that the second light ray 7 does not impinge on the floor 2 over the whole angle range of 360°, but is reflected/remitted by an article 8 in a comparatively small angle range, the article being disposed outside the boundary of the protected zone 4. The article 8 is a stationary article which does not carry out any movements relative to the apparatus 1.

The presence of the article 8 allows the same operating manner of the arrangement as was explained in connection with FIGS. 1a, b. The only difference lies in the fact that here a somewhat modified background reference contour is stored in comparison to FIGS. 1a, b. The distances determined by means of the second light ray 7 namely correspond in that angle range, in which the second light ray 7 impinges on the article 8, to the distance between the apparatus 1 and the respective reflection/remission points disposed on the article 8. With a correspondingly adapted background reference contour, the apparatus 1 therefore "expects" lower distances in the angle range in which the second light ray impinges on the article 8 than in that angle range in which the second light ray 7 impinges on the floor 2 along the line 5.

As long as the article 8 therefore does not move and as long as it is arranged outside the boundary of the protected zone 4, the arrangement in accordance with FIGS. 2a and b operates in accordance with the arrangement in accordance with FIGS. 1a and b.

Figure 3A:
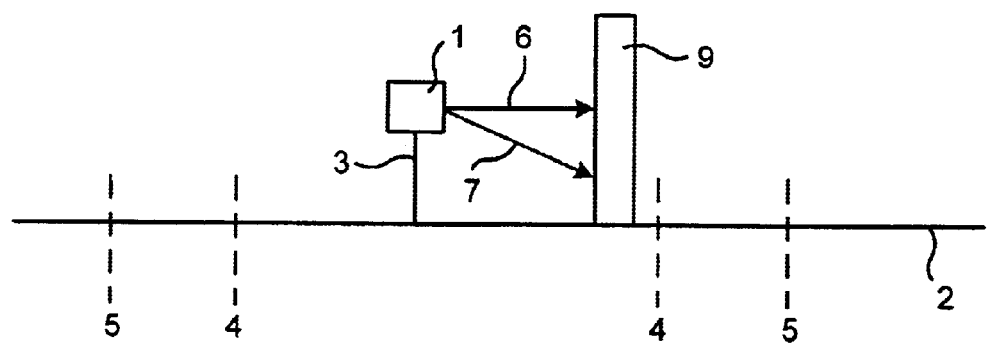
FIG. 3a depicts a side view in accordance with FIG. 1a with a first article disposed in the protected zone.

FIGS. 3a, b show an arrangement in accordance with FIGS. 1a, b with an article 9 arranged inside the boundary of the protected zone 4. The article 9 extends vertically such that both light rays 6, 7 impinge on this article 9. To this extent, both light rays 6, 7 supply distance values which represent the distance between the apparatus 1 and the corresponding reflection/remission points on the article 9. Since the distance determined by means of the light ray 6 is lower than the distance of the apparatus 1 from the boundary of the protected zone 4, a warning signal is triggered which indicates the object 9 present inside the boundary of the protected zone 4. Since a distance is already determined by means of the first light ray 6 which brings about the triggering of a warning signal, the distance value determined by means of the second light ray 7, which in this case naturally does not represent the distance of the reflection line 5 from the apparatus 1, is irrelevant.

Figure 3B:
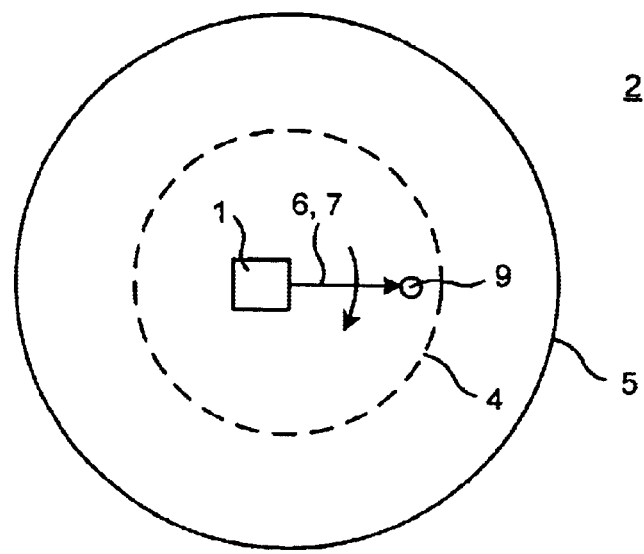
Figure 4A:
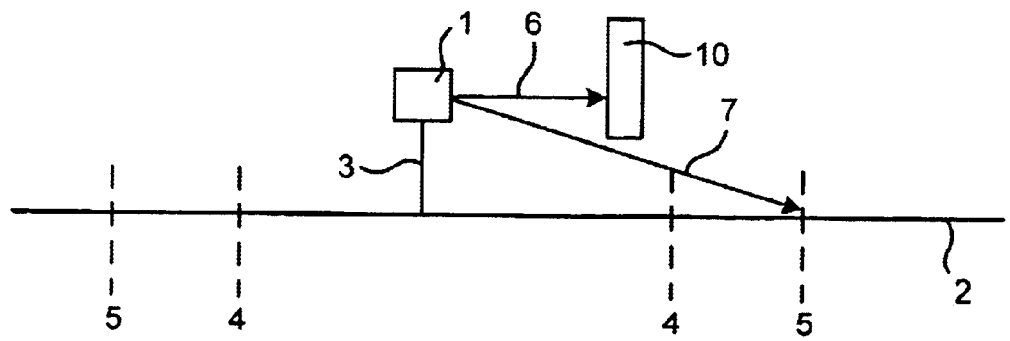
FIG. 4a depicts a side view in accordance with FIG. 1a with a second article disposed in the protected zone.
Figure 4B:
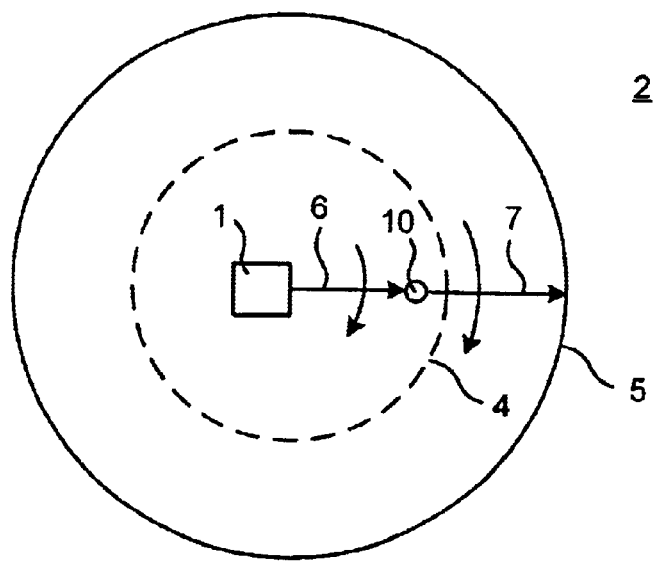

FIGS. 4a, b show an arrangement which substantially corresponds to FIGS. 3a, 3b, with the only difference being that the article 10 present inside the boundary of the protected zone 4 does not extend vertically to the floor 2. The article 10 is rather arranged such that it is detected by the first light ray 6, while the second light ray 7 extends beneath the article 10 and—as with an object-free protected zone—is reflected by the reflection line 5 disposed on the floor 2.

As already explained in connection with FIGS. 3a, b, the distance determined by means of the second light ray 7 is, however, irrelevant if the first light ray 6 already supplies a distance value which indicates an object 10 arranged inside the boundary of the protected zone 4. To this extent, a warning signal is also emitted with the arrangement in accordance with FIGS. 4a, b.

What is claimed is:

1. A method for monitoring a protected zone in which light rays are transmitted by an apparatus in the direction of the protected zone, light rays reflected/remitted by an object disposed in the protected zone are received and the distance between the apparatus and the object is determined, the method comprising:
   transmitting at least two light rays that include an angle between them;
   receiving, while the object is present inside the protected zone, a first light ray of the at least two light rays reflected/remitted by the object;
   receiving, while no object is present within the protected zone, a second light ray of the at least two light rays reflected/remitted from a location disposed outside the protected zone; and
   determining the distance from the apparatus of both the object and a second location,
   wherein a reference contour is determined wherein the second light ray scans a floor or a ceiling of a region surrounding at least one of the protected zone and articles disposed outside the protected zone and that location disposed outside the protected zone is determined in each case at which the second light ray is reflected/remitted,
   wherein a respective current contour is determined by means of the second light ray in certain time intervals and is compared with a stored reference contour, with a maladjustment signal or a manipulation signal being produced when the current contour differs from the reference contour at least to a pre-set degree.

2. A method in accordance with claim 1, wherein the transmitted light rays for a periodic scanning of the protected zone are deflected inside a plane which extends at least substantially perpendicular to the plane containing the transmitted light rays.

3. A method in accordance with claim 1, wherein the respective deflection angles of the transmitted light rays are detected.

4. A method in accordance with claim 1, wherein the positions from which the light rays are reflected/remitted are determined from the distance values and from the associated deflection angles.

5. A method in accordance with claim 1, wherein the determined distance values are compared with previously stored distance values, or positions determined from the distance and deflection angle values are compared with previously stored positions.

6. A method in accordance with claim 1, wherein a warning signal or an error signal is produced when at least one pre-set difference occurs between the determined distance values and the previously stored distance values or between the determined positions and the previously stored positions.

7. A method in accordance with claim 1, wherein the positions of the boundary of the protected zone are stored.

8. A method in accordance with claim 1, wherein the second transmitted light ray is directed at least in a first range of deflection angles to the floor or the ceiling of the region surrounding the protected zone.

9. A method in accordance with claim 1, wherein the second transmitted light ray is directed in a second range of deflection angles to articles disposed outside the protected zone.

10. A method in accordance with claim 1, wherein the first transmitted light ray extends parallel or inclined relative to the floor of the protected zone such that all objects disposed inside the protected zone can be detected by the first light ray.

11. A method in accordance with claim 1, wherein a "protected zone not free" signal is already generated when the first transmitted light ray detects the object inside the protected zone.

12. A method in accordance with claim 1, wherein a "protected zone free" signal is generated when the floor or the ceiling of the region surrounding the protected zone is detected by means of the second light ray and, at the same time, the first transmitted light ray is not reflected/remitted by an unpermitted object disposed inside the protected zone.

13. A method in accordance with claim 1, wherein a "protected zone free" signal is generated when the contour determined by means of the second light ray does not differ from the reference contour, or only differs therefrom within pre-set threshold values and, at the same time, the first transmitted light ray is not reflected/remitted by an object disposed inside the protected zone.

14. A method in accordance with claim 1, wherein at least a further transmitted light ray is directed at least in a first range of deflection angles to the floor or the ceiling of a region surrounding the protected zone; and wherein the further transmitted light ray is directed in a second range of deflection angles to articles such as walls or stationary machinery disposed outside the protected zone.

15. A method in accordance with claim 1, wherein at least a further transmitted light ray extends parallel or inclined relative to the floor of the protected zone such that all objects disposed inside the protected zone can be detected by this further light ray.

16. A method in accordance with claim 1, wherein the light rays are produced in the form of light pulses and the distance values are determined via the respective light transit time.

17. A method in accordance with claim 1, wherein the distance values are determined via a triangulation measurement.

18. A method in accordance with claim 1, wherein the distance between the apparatus and an object disposed inside the protected zone is determined in a redundant manner via at least two transmitted light rays and a "protected zone free" signal can only be generated when the determined distance values do not differ from one another or only differ within a pre-set tolerance.

19. A method in accordance with claim 1, wherein all transmitted light rays are guided by a reflecting/remitting reference target arranged inside the apparatus.

20. A method in accordance with claim 19, wherein the distance to the reference target is determined in a redundant manner via at least two transmitted light rays and a "protected zone free" signal can only be generated when the determined distance values do not differ from one another, or only within a pre-set tolerance.

21. An apparatus for monitoring a protected zone, the apparatus comprising:

a transmitter unit for transmitting light rays in the direction of the protected zone;

a receiver unit for receiving light rays reflected/remitted by an object disposed in the protected zone; and an evaluation unit for determining the distance between the apparatus and the object, wherein the transmitter unit is designed to transmit at least two light rays which include an angle between them, wherein the receiver unit is designed to receive a first light ray of the at least two light rays reflected/remitted by an object disposed inside the protected zone and a second light ray of the at least two light rays reflected/remitted from a location disposed outside the protected zone, wherein the evaluation unit is designed to determine the distance from the apparatus of both the object and the location lying outside the protected zone, wherein a reference contour is determined wherein the second light ray scans a floor or a ceiling of a region surrounding at least one of the protected zone and articles disposed outside the protected zone and that location disposed outside the protected zone is determined in each case at which the second light ray is reflected/remitted, wherein a respective current contour is determined by means of the second light ray in certain time intervals and is compared with a stored reference contour, with a maladjustment signal or a manipulation signal being produced when the current contour differs from the reference contour at least to a pre-set degree.

22. An apparatus in accordance with claim 21, further comprising a light deflection unit for deflecting the transmitted light rays into a plane which extends at least substantially perpendicular to the plane containing the transmitted light rays.

23. An apparatus in accordance with claim 21, further comprising an angle detection unit to determine the respective deflection angle of the transmitted light rays.

24. An apparatus in accordance with claim 21, wherein the transmitter unit includes a single light transmitter to produce at least the first and second light rays by means of a beam fan.

25. An apparatus in accordance with claim 21, wherein the transmitter unit includes at least two light transmitters to produce simultaneously or in time multiplex at least the first light ray and the second light ray.

26. An apparatus in accordance with claim 21, wherein the receiver unit includes only one single light receiver to receive in time multiplex at least the first light ray and the second light ray.

27. An apparatus in accordance with claim 21, wherein the receiver unit is made as a double or multiple receiver.

28. An apparatus in accordance with claim 21, further comprising an additional receiver to receive a light signal transmitted by the transmitter unit and guided inside the apparatus to the additional receiver.

29. An apparatus in accordance with claim 21, further comprising a reflecting or remitting reference target, which is preferably arranged inside the apparatus and which is detected by all of the transmitted light rays.

30. An apparatus in accordance with claim 21, further comprising a comparator unit to compare the determined distance values with previously stored distance values, or to compare positions determined from the distance and deflection angle values with previously stored positions.

* * * * *